United States Patent
Ryan

(10) Patent No.: US 7,512,810 B1
(45) Date of Patent: Mar. 31, 2009

(54) METHOD AND SYSTEM FOR PROTECTING ENCRYPTED FILES TRANSMITTED OVER A NETWORK

(75) Inventor: Nicholas M. Ryan, Sunnyvale, CA (US)

(73) Assignee: Guardian Data Storage LLC, Wilmington, DE (US)

( * ) Notice: Subject to any disclaimer, the term of this patent is extended or adjusted under 35 U.S.C. 154(b) by 766 days.

(21) Appl. No.: 10/242,185

(22) Filed: Sep. 11, 2002

(51) Int. Cl.
*H04L 9/32* (2006.01)

(52) U.S. Cl. ............... 713/189; 726/13; 726/16; 726/26; 726/27; 707/9; 707/10; 710/22; 710/28

(58) Field of Classification Search ............... 726/3, 726/2, 4, 13, 16, 26, 27; 713/165, 189, 182, 713/168; 709/201, 229, 223, 225; 707/9–10; 705/51; 710/22, 28
See application file for complete search history.

(56) References Cited

U.S. PATENT DOCUMENTS

| | | | |
|---|---|---|---|
| 4,203,166 A | 5/1980 | Ehrsam et al. |
| 4,734,568 A | 3/1988 | Watanabe |
| 4,757,533 A | 7/1988 | Allen et al. |
| 4,796,220 A | 1/1989 | Wolfe |
| 4,799,258 A | 1/1989 | Davies |
| 4,827,508 A | 5/1989 | Shear |
| 4,888,800 A | 12/1989 | Marshall et al. |
| 4,972,472 A | 11/1990 | Brown et al. |
| 5,032,979 A | 7/1991 | Hecht et al. |
| 5,052,040 A | 9/1991 | Preston et al. |
| 5,058,164 A | 10/1991 | Elmer et al. |
| 5,144,660 A | 9/1992 | Rose |

(Continued)

FOREIGN PATENT DOCUMENTS

EP 0 672 991 A2 9/1995

(Continued)

OTHER PUBLICATIONS

"Inside Encrypting File System," Part 1, from MSDN Oct. 2001 version, exact publication date in unknown but believed prior to Dec. 12, 2001.

(Continued)

*Primary Examiner*—Thanhnga B Truong
(74) *Attorney, Agent, or Firm*—Sterne, Kessler, Goldstein & Fox P.L.L.C.

(57) ABSTRACT

An improved system and approaches for protecting secured files when being used by an application (e.g., network browser) that potentially transmits the files over a network to unknown external locations are disclosed. According to one aspect, access to secured files is restricted so that unsecured versions of the secured files are not able to be transmitted over a network (e.g., the Internet) to unauthorized destinations. In one embodiment, in opening a file for use by a network browser, the network browser receives a secured (e.g., encrypted) version of the secured file when the destination location (e.g., destination address) for the network browser is not trusted, but receives an unsecured (e.g., unencrypted) version of the secured file when the destination location for the network browser is trusted. According to another aspect, processes operating on a computer system are monitored to determine destination locations, if any, of said processes, and then using such destination locations to determine whether to permit the processes to open files in a secure or unsecured manner.

33 Claims, 6 Drawing Sheets

U.S. PATENT DOCUMENTS

| | | | |
|---|---|---|---|
| 5,204,897 A | 4/1993 | Wyman | |
| 5,220,657 A | 6/1993 | Bly et al. | |
| 5,235,641 A | 8/1993 | Nozawa et al. | |
| 5,247,575 A | 9/1993 | Sprague et al. | |
| 5,276,735 A | 1/1994 | Boebert et al. | |
| 5,301,247 A | 4/1994 | Rasmussen et al. | |
| 5,319,705 A | 6/1994 | Halter et al. | |
| 5,369,702 A | 11/1994 | Shanton | |
| 5,375,169 A | 12/1994 | Seheidt et al. | |
| 5,404,404 A | 4/1995 | Novorita | |
| 5,406,628 A | 4/1995 | Beller et al. | |
| 5,414,852 A | 5/1995 | Kramer et al. | |
| 5,495,533 A | 2/1996 | Linehan et al. | |
| 5,499,297 A | 3/1996 | Boebert | |
| 5,502,766 A | 3/1996 | Boebert et al. | |
| 5,535,375 A | 7/1996 | Eshel et al. | |
| 5,557,765 A | 9/1996 | Lipner et al. | |
| 5,570,108 A | 10/1996 | McLaughlin et al. | |
| 5,584,023 A | 12/1996 | Hsu | |
| 5,600,722 A | 2/1997 | Yamaguchi et al. | |
| 5,606,663 A | 2/1997 | Kadooka | |
| 5,655,119 A | 8/1997 | Davy | |
| 5,661,806 A | 8/1997 | Nevoux et al. | |
| 5,671,412 A | 9/1997 | Christiano | |
| 5,673,316 A | 9/1997 | Auerbach et al. | |
| 5,677,953 A | 10/1997 | Dolphin | |
| 5,680,452 A | 10/1997 | Shanton | |
| 5,684,987 A | 11/1997 | Mamiya et al. | |
| 5,689,718 A | 11/1997 | Sakurai et al. | |
| 5,699,428 A | 12/1997 | McDonnal et al. | |
| 5,708,709 A | 1/1998 | Rose | |
| 5,715,403 A | 2/1998 | Stefik | |
| 5,717,755 A | 2/1998 | Shanton | |
| 5,720,033 A | 2/1998 | Deo | |
| 5,729,734 A | 3/1998 | Parker et al. | |
| 5,732,265 A | 3/1998 | Dewitt et al. | |
| 5,745,573 A | 4/1998 | Lipner et al. | |
| 5,748,736 A | 5/1998 | Mittra | |
| 5,751,287 A | 5/1998 | Hahn et al. | |
| 5,757,920 A | 5/1998 | Misra et al. | |
| 5,765,152 A | 6/1998 | Ericson | |
| 5,778,065 A | 7/1998 | Hauser et al. | |
| 5,787,169 A | 7/1998 | Eldridge et al. | |
| 5,787,173 A | 7/1998 | Seheidt et al. | |
| 5,787,175 A | 7/1998 | Carter | |
| 5,790,789 A | 8/1998 | Suarez | |
| 5,790,790 A | 8/1998 | Smith et al. | |
| 5,813,009 A | 9/1998 | Johnson et al. | |
| 5,821,933 A | 10/1998 | Keller et al. | |
| 5,825,876 A | 10/1998 | Peterson | |
| 5,835,592 A | 11/1998 | Chang et al. | |
| 5,835,601 A | 11/1998 | Shimbo et al. | |
| 5,857,189 A | 1/1999 | Riddle | |
| 5,862,325 A | 1/1999 | Reed et al. | |
| 5,870,468 A | 2/1999 | Harrison | |
| 5,870,477 A | 2/1999 | Sasaki et al. | |
| 5,881,287 A | 3/1999 | Mast | |
| 5,892,900 A | 4/1999 | Ginter et al. | |
| 5,893,084 A | 4/1999 | Morgan et al. | |
| 5,898,781 A | 4/1999 | Shanton | |
| 5,922,073 A | 7/1999 | Shimada | |
| 5,923,754 A | 7/1999 | Angelo et al. | |
| 5,933,498 A * | 8/1999 | Schneck et al. | 705/54 |
| 5,944,794 A | 8/1999 | Okamoto et al. | |
| 5,953,419 A | 9/1999 | Lohstroh et al. | |
| 5,968,177 A | 10/1999 | Batten-Carew et al. | |
| 5,970,502 A | 10/1999 | Salkewicz et al. | |
| 5,987,440 A | 11/1999 | O'Neil et al. | |
| 5,991,879 A | 11/1999 | Still | |
| 5,999,907 A | 12/1999 | Donner | |
| 6,014,730 A | 1/2000 | Ohtsu | |
| 6,023,506 A | 2/2000 | Ote et al. | |
| 6,032,216 A | 2/2000 | Schmuck et al. | |
| 6,038,322 A | 3/2000 | Harkins | |
| 6,044,155 A | 3/2000 | Thomlinson et al. | |
| 6,055,314 A | 4/2000 | Spies et al. | |
| 6,058,424 A | 5/2000 | Dixon et al. | |
| 6,061,790 A | 5/2000 | Bodnar | |
| 6,069,957 A | 5/2000 | Richards | |
| 6,085,323 A | 7/2000 | Shimizu et al. | |
| 6,088,717 A | 7/2000 | Reed et al. | |
| 6,088,805 A | 7/2000 | Davis et al. | |
| 6,098,056 A | 8/2000 | Rusnak et al. | |
| 6,101,507 A | 8/2000 | Cane et al. | |
| 6,105,131 A | 8/2000 | Carroll | |
| 6,122,630 A | 9/2000 | Strickler et al. | |
| 6,134,327 A | 10/2000 | Van Oorschot | |
| 6,134,658 A | 10/2000 | Multerer et al. | |
| 6,134,660 A | 10/2000 | Boneh et al. | |
| 6,134,664 A | 10/2000 | Walker | |
| 6,141,754 A | 10/2000 | Choy | |
| 6,145,084 A | 11/2000 | Zuili | |
| 6,158,010 A | 12/2000 | Moriconi et al. | |
| 6,161,139 A | 12/2000 | Win et al. | |
| 6,182,142 B1 | 1/2001 | Win et al. | |
| 6,185,684 B1 | 2/2001 | Pravetz et al. | |
| 6,205,549 B1 | 3/2001 | Pravetz et al. | |
| 6,212,561 B1 | 4/2001 | Sitaraman et al. | |
| 6,223,285 B1 | 4/2001 | Komuro et al. | |
| 6,226,618 B1 | 5/2001 | Downs et al. | |
| 6,226,745 B1 | 5/2001 | Wiederhold et al. | |
| 6,240,188 B1 | 5/2001 | Dondeti et al. | |
| 6,249,873 B1 | 6/2001 | Richard et al. | |
| 6,253,193 B1 | 6/2001 | Ginter et al. | |
| 6,260,040 B1 | 7/2001 | Kauffman et al. | |
| 6,260,141 B1 | 7/2001 | Park | |
| 6,263,348 B1 | 7/2001 | Kathrow et al. | |
| 6,272,631 B1 | 8/2001 | Thomlinson et al. | |
| 6,272,632 B1 | 8/2001 | Carmen et al. | |
| 6,282,649 B1 | 8/2001 | Lambert et al. | |
| 6,289,450 B1 | 9/2001 | Pensak et al. | |
| 6,292,895 B1 | 9/2001 | Baltzley | |
| 6,292,899 B1 | 9/2001 | McBride | |
| 6,295,361 B1 | 9/2001 | Kadansky et al. | |
| 6,301,614 B1 | 10/2001 | Najork et al. | |
| 6,308,256 B1 | 10/2001 | Folmsbee | |
| 6,308,273 B1 | 10/2001 | Goertzel et al. | |
| 6,314,409 B2 | 11/2001 | Schneck et al. | |
| 6,317,777 B1 | 11/2001 | Skarbo et al. | |
| 6,332,025 B2 | 12/2001 | Takahashi et al. | |
| 6,336,114 B1 | 1/2002 | Garrison | |
| 6,339,423 B1 | 1/2002 | Sampson et al. | |
| 6,339,825 B2 | 1/2002 | Pensak et al. | |
| 6,341,164 B1 | 1/2002 | Dilkie et al. | |
| 6,343,316 B1 | 1/2002 | Sakata | |
| 6,347,374 B1 | 2/2002 | Drake et al. | |
| 6,349,337 B1 | 2/2002 | Parsons et al. | |
| 6,351,813 B1 | 2/2002 | Mooney et al. | |
| 6,356,903 B1 | 3/2002 | Baxter et al. | |
| 6,356,941 B1 * | 3/2002 | Cohen | 709/219 |
| 6,357,010 B1 | 3/2002 | Viets et al. | |
| 6,363,480 B1 | 3/2002 | Perlman | |
| 6,370,249 B1 | 4/2002 | Van Oorschot | |
| 6,381,698 B1 | 4/2002 | Devanbu et al. | |
| 6,389,433 B1 | 5/2002 | Bolosky et al. | |
| 6,389,538 B1 | 5/2002 | Gruse et al. | |
| 6,393,420 B1 | 5/2002 | Peters | |
| 6,405,315 B1 | 6/2002 | Burns et al. | |
| 6,421,714 B1 | 7/2002 | Rai et al. | |
| 6,442,688 B1 | 8/2002 | Moses et al. | |
| 6,442,695 B1 | 8/2002 | Dutcher et al. | |
| 6,446,090 B1 | 9/2002 | Hart | |
| 6,449,721 B1 | 9/2002 | Pensak et al. | |
| 6,453,353 B1 | 9/2002 | Win et al. | |

| | | |
|---|---|---|
| 6,466,932 B1 | 10/2002 | Dennis et al. |
| 6,477,544 B1 | 11/2002 | Bolosky et al. |
| 6,490,680 B1 | 12/2002 | Scheidt et al. |
| 6,505,300 B2 | 1/2003 | Chan et al. |
| 6,510,349 B1 | 1/2003 | Schnek et al. |
| 6,529,956 B1 | 3/2003 | Smith et al. |
| 6,530,020 B1 | 3/2003 | Aoki |
| 6,530,024 B1 | 3/2003 | Proctor |
| 6,542,608 B2 | 4/2003 | Scheidt et al. |
| 6,549,623 B1 | 4/2003 | Scheidt et al. |
| 6,550,011 B1 | 4/2003 | Sims |
| 6,557,039 B1 | 4/2003 | Leong et al. |
| 6,567,914 B1 | 5/2003 | Just et al. |
| 6,571,291 B1 | 5/2003 | Chow |
| 6,584,466 B1 | 6/2003 | Serbinis et al. |
| 6,587,946 B1 | 7/2003 | Jakobsson |
| 6,588,673 B1 | 7/2003 | Chan et al. |
| 6,594,662 B1 | 7/2003 | Sieffert et al. |
| 6,598,161 B1 | 7/2003 | Kluttz et al. |
| 6,603,857 B1 | 8/2003 | Batten-Carew et al. |
| 6,608,636 B1 | 8/2003 | Roseman |
| 6,611,599 B2 | 8/2003 | Natarajan |
| 6,615,349 B1 | 9/2003 | Hair |
| 6,615,350 B1 | 9/2003 | Schell et al. |
| 6,625,650 B2 | 9/2003 | Stelliga |
| 6,629,243 B1 | 9/2003 | Kleinman et al. |
| 6,633,311 B1 | 10/2003 | Douvikas et al. |
| 6,640,307 B2 | 10/2003 | Viets et al. |
| 6,646,515 B2 | 11/2003 | Jun et al. |
| 6,647,388 B2 | 11/2003 | Numao et al. |
| 6,678,835 B1 | 1/2004 | Shah et al. |
| 6,687,822 B1 | 2/2004 | Jakobsson |
| 6,711,683 B1 | 3/2004 | Laczko et al. |
| 6,718,361 B1 | 4/2004 | Basani et al. |
| 6,735,701 B1 | 5/2004 | Jacobson |
| 6,738,908 B1 | 5/2004 | Bonn et al. |
| 6,775,779 B1 | 8/2004 | England et al. |
| 6,782,403 B1 | 8/2004 | Kino et al. |
| 6,801,999 B1 | 10/2004 | Venkatesan et al. |
| 6,807,534 B1 | 10/2004 | Erickson |
| 6,807,636 B2 | 10/2004 | Hartman et al. |
| 6,810,389 B1 | 10/2004 | Meyer |
| 6,810,479 B1 | 10/2004 | Barlow et al. |
| 6,816,871 B2 | 11/2004 | Lee |
| 6,826,698 B1 | 11/2004 | Minkin et al. |
| 6,834,333 B2 | 12/2004 | Yoshino et al. |
| 6,834,341 B1 | 12/2004 | Bahl et al. |
| 6,845,452 B1 | 1/2005 | Roddy et al. |
| 6,851,050 B2 | 2/2005 | Singhal et al. |
| 6,865,555 B2 | 3/2005 | Novak |
| 6,874,139 B2 | 3/2005 | Krueger et al. |
| 6,877,136 B2 | 4/2005 | Bess et al. |
| 6,889,210 B1 | 5/2005 | Vainstein |
| 6,891,953 B1 | 5/2005 | DeMello et al. |
| 6,892,201 B2 | 5/2005 | Brown et al. |
| 6,892,306 B1 | 5/2005 | En-Seung et al. |
| 6,907,034 B1 | 6/2005 | Begis |
| 6,909,708 B1 | 6/2005 | Krishnaswamy et al. |
| 6,915,434 B1 | 7/2005 | Kuroda et al. |
| 6,920,558 B2 | 7/2005 | Sames et al. |
| 6,931,450 B2 | 8/2005 | Howard et al. |
| 6,931,530 B2 * | 8/2005 | Pham et al. ................ 713/165 |
| 6,931,597 B1 | 8/2005 | Prakash |
| 6,938,042 B2 | 8/2005 | Aboulhosn et al. |
| 6,941,355 B1 | 9/2005 | Donaghey et al. |
| 6,941,456 B2 | 9/2005 | Wilson |
| 6,941,472 B2 | 9/2005 | Moriconi et al. |
| 6,944,183 B1 | 9/2005 | Iyer et al. |
| 6,947,556 B1 | 9/2005 | Matyas, Jr. et al. |
| 6,950,818 B2 | 9/2005 | Dennis et al. |
| 6,950,936 B2 | 9/2005 | Subramaniam et al. |
| 6,950,941 B1 | 9/2005 | Lee et al. |
| 6,950,943 B1 | 9/2005 | Bacha et al. |
| 6,952,780 B2 | 10/2005 | Olsen et al. |
| 6,957,261 B2 | 10/2005 | Lortz |
| 6,959,308 B2 | 10/2005 | Gramsamer et al. |
| 6,961,849 B1 | 11/2005 | Davis et al. |
| 6,968,060 B1 | 11/2005 | Pinkas |
| 6,971,018 B1 | 11/2005 | Witt et al. |
| 6,978,376 B2 | 12/2005 | Giroux et al. |
| 6,978,377 B1 | 12/2005 | Asano et al. |
| 6,988,133 B1 | 1/2006 | Zavalkovsky et al. |
| 6,988,199 B2 | 1/2006 | Toh et al. |
| 6,993,135 B2 | 1/2006 | Ishibashi |
| 6,996,718 B1 | 2/2006 | Henry et al. |
| 7,003,117 B2 | 2/2006 | Kacker et al. |
| 7,003,560 B1 | 2/2006 | Mullen et al. |
| 7,003,661 B2 | 2/2006 | Beattie et al. |
| 7,013,332 B2 | 3/2006 | Friedel et al. |
| 7,013,485 B2 | 3/2006 | Brown et al. |
| 7,020,645 B2 | 3/2006 | Bisbee et al. |
| 7,024,427 B2 | 4/2006 | Bobbitt et al. |
| 7,035,854 B2 | 4/2006 | Hsiao et al. |
| 7,035,910 B1 | 4/2006 | Dutta et al. |
| 7,046,807 B2 | 5/2006 | Hirano et al. |
| 7,051,213 B1 | 5/2006 | Kobayashi et al. |
| 7,058,696 B1 | 6/2006 | Phillips et al. |
| 7,058,978 B2 * | 6/2006 | Feuerstein et al. ............ 726/26 |
| 7,073,063 B2 | 7/2006 | Peinado |
| 7,073,073 B1 | 7/2006 | Nonaka et al. |
| 7,076,067 B2 | 7/2006 | Raike et al. |
| 7,076,312 B2 | 7/2006 | Law et al. |
| 7,076,469 B2 | 7/2006 | Schreiber et al. |
| 7,076,633 B2 | 7/2006 | Tormasov et al. |
| 7,080,077 B2 | 7/2006 | Ramamurthy et al. |
| 7,095,853 B2 | 8/2006 | Morishita |
| 7,096,266 B2 | 8/2006 | Lewin et al. |
| 7,099,926 B1 | 8/2006 | Ims et al. |
| 7,107,269 B2 | 9/2006 | Arlein et al. |
| 7,120,635 B2 | 10/2006 | Bhide et al. |
| 7,120,757 B2 | 10/2006 | Tsuge |
| 7,124,164 B1 | 10/2006 | Chemtob |
| 7,130,964 B2 | 10/2006 | Ims et al. |
| 7,131,071 B2 | 10/2006 | Gune et al. |
| 7,134,041 B2 | 11/2006 | Murray et al. |
| 7,136,903 B1 | 11/2006 | Phillips et al. |
| 7,145,898 B1 | 12/2006 | Elliott |
| 7,146,498 B1 | 12/2006 | Takechi et al. |
| 7,159,036 B2 | 1/2007 | Hinchliffe et al. |
| 7,171,557 B2 | 1/2007 | Kallahalla et al. |
| 7,174,563 B1 | 2/2007 | Brownlie et al. |
| 7,177,427 B1 | 2/2007 | Komuro et al. |
| 7,178,033 B1 | 2/2007 | Garcia |
| 7,181,017 B1 | 2/2007 | Nagel et al. |
| 7,185,364 B2 | 2/2007 | Knouse et al. |
| 7,187,033 B2 | 3/2007 | Pendharkar |
| 7,188,181 B1 | 3/2007 | Squier et al. |
| 7,194,764 B2 | 3/2007 | Martherus et al. |
| 7,200,747 B2 | 4/2007 | Riedel et al. |
| 7,203,317 B2 | 4/2007 | Kallahalla et al. |
| 7,203,968 B2 | 4/2007 | Asano et al. |
| 7,219,230 B2 | 5/2007 | Riedel et al. |
| 7,224,795 B2 | 5/2007 | Takada et al. |
| 7,225,256 B2 | 5/2007 | Villavicencio |
| 7,227,953 B2 | 6/2007 | Shida |
| 7,233,948 B1 | 6/2007 | Shamoon et al. |
| 7,237,002 B1 | 6/2007 | Estrada et al. |
| 7,249,044 B2 | 7/2007 | Kumar et al. |
| 7,260,555 B2 | 8/2007 | Rossmann et al. |
| 7,265,764 B2 | 9/2007 | Alben et al. |
| 7,266,684 B2 | 9/2007 | Jancula |
| 7,280,658 B2 | 10/2007 | Amini et al. |
| 7,287,055 B2 | 10/2007 | Smith et al. |
| 7,290,148 B2 | 10/2007 | Tozawa et al. |
| 7,308,702 B1 | 12/2007 | Thomsen et al. |
| 7,313,824 B1 | 12/2007 | Bala et al. |

| | | |
|---|---|---|
| 7,319,752 B2 | 1/2008 | Asano et al. |
| 7,380,120 B1 | 5/2008 | Garcia |
| 7,383,586 B2 | 6/2008 | Cross et al. |
| 7,386,529 B2 | 6/2008 | Kiessig et al. |
| 2001/0011254 A1 | 8/2001 | Clark |
| 2001/0021926 A1 | 9/2001 | Schneck et al. |
| 2001/0032181 A1 | 10/2001 | Jakstadt et al. |
| 2001/0034839 A1 | 10/2001 | Karjoth et al. |
| 2001/0044903 A1 | 11/2001 | Yamamoto et al. |
| 2001/0056550 A1 | 12/2001 | Lee |
| 2002/0010679 A1 | 1/2002 | Felsher |
| 2002/0016922 A1 | 2/2002 | Richards et al. |
| 2002/0031230 A1 | 3/2002 | Sweet et al. |
| 2002/0035624 A1 | 3/2002 | Kim |
| 2002/0046350 A1 | 4/2002 | Lordemann et al. |
| 2002/0050098 A1 | 5/2002 | Chan |
| 2002/0056042 A1 | 5/2002 | Van Der Kaay et al. |
| 2002/0062240 A1 | 5/2002 | Morinville |
| 2002/0062245 A1 | 5/2002 | Niu et al. |
| 2002/0069077 A1 | 6/2002 | Brophy et al. |
| 2002/0069272 A1 | 6/2002 | Kim et al. |
| 2002/0069363 A1 | 6/2002 | Winburn |
| 2002/0073320 A1 | 6/2002 | Rinkevich et al. |
| 2002/0077986 A1 | 6/2002 | Kobata et al. |
| 2002/0077988 A1 | 6/2002 | Sasaki et al. |
| 2002/0087479 A1 | 7/2002 | Malcolm |
| 2002/0099947 A1 | 7/2002 | Evans |
| 2002/0124180 A1 | 9/2002 | Hagman |
| 2002/0129235 A1 | 9/2002 | Okamoto et al. |
| 2002/0133699 A1 | 9/2002 | Pueschel |
| 2002/0138762 A1 | 9/2002 | Horne |
| 2002/0143710 A1 | 10/2002 | Liu |
| 2002/0143906 A1 | 10/2002 | Tormasov et al. |
| 2002/0156726 A1 | 10/2002 | Kleckner et al. |
| 2002/0157016 A1 | 10/2002 | Russell et al. |
| 2002/0169963 A1 | 11/2002 | Seder et al. |
| 2002/0169965 A1 | 11/2002 | Hale et al. |
| 2002/0172367 A1 | 11/2002 | Mulder et al. |
| 2002/0174109 A1 | 11/2002 | Chandy et al. |
| 2002/0176572 A1 | 11/2002 | Ananth |
| 2002/0178271 A1 | 11/2002 | Graham et al. |
| 2002/0194484 A1 | 12/2002 | Bolosky et al. |
| 2002/0198798 A1 | 12/2002 | Ludwig et al. |
| 2003/0009685 A1 | 1/2003 | Choo et al. |
| 2003/0014391 A1 | 1/2003 | Evans et al. |
| 2003/0023559 A1 | 1/2003 | Choi et al. |
| 2003/0028610 A1 | 2/2003 | Pearson |
| 2003/0033528 A1 | 2/2003 | Ozog et al. |
| 2003/0037133 A1 | 2/2003 | Owens |
| 2003/0037237 A1 | 2/2003 | Abgrall et al. |
| 2003/0037253 A1 | 2/2003 | Blank et al. |
| 2003/0046238 A1 | 3/2003 | Nonaka et al. |
| 2003/0051039 A1 | 3/2003 | Brown et al. |
| 2003/0056139 A1 | 3/2003 | Murray et al. |
| 2003/0074580 A1 | 4/2003 | Knouse et al. |
| 2003/0078959 A1 | 4/2003 | Yeung et al. |
| 2003/0079175 A1 | 4/2003 | Limantsev |
| 2003/0081784 A1 | 5/2003 | Kallahalla et al. |
| 2003/0081787 A1 | 5/2003 | Kallahalla et al. |
| 2003/0088517 A1 | 5/2003 | Medoff |
| 2003/0088783 A1 | 5/2003 | DiPierro |
| 2003/0110169 A1 | 6/2003 | Zuili |
| 2003/0110266 A1 | 6/2003 | Rollins et al. |
| 2003/0110397 A1 | 6/2003 | Supramaniam |
| 2003/0115146 A1 | 6/2003 | Lee et al. |
| 2003/0115570 A1 | 6/2003 | Bisceglia |
| 2003/0120601 A1 | 6/2003 | Ouye |
| 2003/0120684 A1 | 6/2003 | Zuili et al. |
| 2003/0126434 A1 | 7/2003 | Lim et al. |
| 2003/0154381 A1 | 8/2003 | Ouye |
| 2003/0159066 A1 | 8/2003 | Staw et al. |
| 2003/0177070 A1 | 9/2003 | Viswanath et al. |
| 2003/0177378 A1 | 9/2003 | Wittkotter |
| 2003/0182579 A1 | 9/2003 | Leporini et al. |
| 2003/0196096 A1 | 10/2003 | Sutton |
| 2003/0197729 A1 | 10/2003 | Denoue et al. |
| 2003/0200202 A1 | 10/2003 | Hsiao et al. |
| 2003/0217264 A1 | 11/2003 | Martin et al. |
| 2003/0217281 A1 | 11/2003 | Ryan |
| 2003/0217333 A1 | 11/2003 | Smith et al. |
| 2003/0226013 A1 | 12/2003 | Dutertre |
| 2003/0233650 A1 | 12/2003 | Zaner et al. |
| 2004/0022390 A1 | 2/2004 | McDonald et al. |
| 2004/0025037 A1 | 2/2004 | Hair |
| 2004/0039781 A1 | 2/2004 | LaVallee et al. |
| 2004/0064710 A1 | 4/2004 | Vainstein |
| 2004/0068524 A1 | 4/2004 | Aboulhosn et al. |
| 2004/0068664 A1 | 4/2004 | Nachenberg et al. |
| 2004/0073718 A1 | 4/2004 | Johannessen et al. |
| 2004/0088548 A1 | 5/2004 | Smetters et al. |
| 2004/0098580 A1 | 5/2004 | DeTreville |
| 2004/0103202 A1 | 5/2004 | Hildebrand et al. |
| 2004/0103280 A1 | 5/2004 | Balfanz et al. |
| 2004/0133544 A1 | 7/2004 | Kiessig et al. |
| 2004/0158586 A1 | 8/2004 | Tsai |
| 2004/0193602 A1 | 9/2004 | Liu et al. |
| 2004/0193905 A1 | 9/2004 | Lirov et al. |
| 2004/0193912 A1 | 9/2004 | Li et al. |
| 2004/0199514 A1 | 10/2004 | Rosenblatt et al. |
| 2004/0215956 A1 | 10/2004 | Venkatachary et al. |
| 2004/0215962 A1 | 10/2004 | Douceur et al. |
| 2004/0243853 A1 | 12/2004 | Swander et al. |
| 2005/0021467 A1 | 1/2005 | Franzdonk |
| 2005/0021629 A1 | 1/2005 | Cannata et al. |
| 2005/0028006 A1 | 2/2005 | Leser et al. |
| 2005/0039034 A1 | 2/2005 | Doyle et al. |
| 2005/0071275 A1 | 3/2005 | Vainstein et al. |
| 2005/0071657 A1 | 3/2005 | Ryan |
| 2005/0071658 A1 | 3/2005 | Nath et al. |
| 2005/0081029 A1 | 4/2005 | Thornton et al. |
| 2005/0086531 A1 | 4/2005 | Kenrich |
| 2005/0091484 A1 | 4/2005 | Thornton et al. |
| 2005/0120199 A1 | 6/2005 | Carter |
| 2005/0138371 A1 | 6/2005 | Supramaniam |
| 2005/0138383 A1 | 6/2005 | Vainstein |
| 2005/0177716 A1 | 8/2005 | Ginter et al. |
| 2005/0177858 A1 | 8/2005 | Ueda |
| 2005/0198326 A1 | 9/2005 | Schlimmer et al. |
| 2005/0223242 A1 | 10/2005 | Nath |
| 2005/0223414 A1 | 10/2005 | Kenrich et al. |
| 2005/0256909 A1 | 11/2005 | Aboulhosn et al. |
| 2005/0273600 A1 | 12/2005 | Seeman |
| 2005/0283610 A1 | 12/2005 | Serret-Avila et al. |
| 2005/0288961 A1 | 12/2005 | Tabrizi |
| 2006/0005021 A1 | 1/2006 | Torrubia-Saez |
| 2006/0075465 A1 | 4/2006 | Ramanathan et al. |
| 2006/0093150 A1 | 5/2006 | Reddy et al. |
| 2006/0168147 A1 | 7/2006 | Inoue et al. |
| 2006/0230437 A1 | 10/2006 | Boyer et al. |
| 2007/0006214 A1 | 1/2007 | Dubal et al. |

FOREIGN PATENT DOCUMENTS

| | | |
|---|---|---|
| EP | 0 674 253 A1 | 9/1995 |
| EP | 0 809 170 A1 | 11/1997 |
| EP | 0 913 966 A2 | 5/1999 |
| EP | 0 913 967 A2 | 5/1999 |
| EP | 0 950 941 A2 | 10/1999 |
| EP | 0 950 941 A3 | 10/1999 |
| EP | 1 107 504 B1 | 6/2001 |
| EP | 1 107504 A2 | 6/2001 |
| EP | 1 130 492 A2 | 9/2001 |
| EP | 1 154 348 A2 | 11/2001 |
| EP | 1324565 A1 | 7/2003 |
| GB | 2 328 047 A | 2/1999 |
| JP | 2001-036517 | 2/2001 |

| WO | WO 96/41288 A1 | 12/1996 |
| WO | WO 00/56028 A2 | 9/2000 |
| WO | WO 01/61438 A2 | 8/2001 |
| WO | WO 01/63387 A2 | 8/2001 |
| WO | WO 01/63387 A3 | 8/2001 |
| WO | WO 01/77783 A2 | 10/2001 |
| WO | WO 01/78285 A1 | 10/2001 |
| WO | WO 01/84271 A2 | 11/2001 |

OTHER PUBLICATIONS

"Inside Encrypting File System," Part 2, from MSDN Oct. 2001 version, exact publication date in unknown but believed prior to Dec. 12, 2001.
"Security with Encrypting File System," from MSDN Oct. 2001 version, exact publication date in unknown but believed prior to Dec. 12, 2001.
"How EFS Works," from MSDN Oct. 2001 version, exact publication date in unknown but believed prior to Dec. 12, 2001.
"Encrypting File System," from MSDN Oct. 2001 version, exact publication date in unknown but believed prior to Dec. 12, 2001.
"Features of EFS," from MSDN Oct. 2001 version, exact publication date in unknown but believed prior to Dec. 12, 2001.
"Windows 2000 EFS," in the Apr. 1999 issue of *Windows NT Magazine*.
Expiration Mechanism for Chipcards, IBM Technical Disclosure Bulletin, Oct. 1, 2001, UK.
McDaniel et al. "Antigone: A Flexible Framework for Secure Group Communication," Proceedings of the 8th USENIX Security Symposium, Aug. 23, 1999.
Stallings, William, "Cryptography and Network Security: Principles and Practice," 1999, pp. 333-337, Second Edition, Prentice Hall, Upper Saddle River, New Jersey.
"Affect," The American Heritage Dictionary of the English Language, Fourth Edition, Houghton Mifflin Company, 2002. Retrieved May 4, 2006 from http://dictionary.reference.com/search?q=affect.
Microsoft Windows 200 server. Windows 2000 Group Policy White Paper, 2000.
Symantec. Norton Antivirus Corporate Edition Implementation Guide, 1999.
Crocker, Steven Toye, "Multi-level cryptographic transformations for securing digital assets," U.S. Appl. No. 10/404,566, filed Mar. 31, 2003.
Crocker, Steven Toye, "Effectuating access policy changes to designated places for secured files," U.S. Appl. No. 10/259,075, filed Sep. 27, 2002.
Kenrich, Michael Frederick, "Multi-Level File Digest", U.S. Appl. No. 10/894,493, filed Jul. 19, 2004.
Kinghorn, Gary Mark, "Method and system for protecting electronic data in enterprise environment," U.S. Appl. No. 10/159,220, filed May 31, 2002.
Nath, Satyajit, "Method and system for securing digital assets using content type designations," U.S. Appl. No. 10/405,587, filed Apr. 1, 2003.
Prakash, Nalini J., "Method and apparatus for securing/unsecuring files by file crawling," U.S. Appl. No. 10/325,102, filed Dec. 20, 2002.
Rossmann, Alain, "Hybrid systems for securing digital assets," U.S. Appl. No. 10/325,013, filed Dec. 20, 2002.
A Real-Time Push-Pull Communications Model for Distributed Real-Time and Multimedia Systems, Jan. 1999, School of Computer Sciences Carnegie Mellon University, Kanaka Juvva, Raj Rajkumar.
U.S. Appl. No. 10/889,685, entitled "Method and Apparatus for Controlling the Speed Ranges of a Machine" inventor Thomas, Jul. 13, 2004, 18 pgs.
U.S. Appl. No. 10/028,397, entitled "Method and system for restricting use of a clipboard application," inventor Zuili, Dec. 21, 2001, 38 pgs.
U.S. Appl. No. 10/368,277, entitled "Method and apparatus for uniquely identifying files," inventor Ouye, Feb. 18, 2003, 25 pgs.
U.S. Appl. No. 10/327,320, entitled "Security system with staging capabilities" inventor Vainstein, Dec. 20, 2002, 39 pgs.

U.S. Appl. No. 10/286,524, entitled "Security system that uses indirect password-based encryption," inventor Gutnik, Nov. 1, 2002, 38 pgs.
U.S. Appl. No. 10/642,041, entitled "Method and system for fault-tolerant transfer of files across a network" inventor Kenrich, Aug. 15, 2003, 32 pgs.
U.S. Appl. No. 10/610,832, entitled "Method and system for enabling users of a group shared across multiple file security systems to access secured files" inventor Ryan, Jun. 30, 2003, 33 pgs.
U.S. Appl. No. 10/448,806, entitled "Method and System for Using Remote Headers to Secure Electronic Files" inventor Ryan, May 30, 2003, 35 pgs.
U.S. Appl. No. 10/074,194, entitled "Methods for idnetifying compunds that inhibit or reduce PTP1B expressions" inventor Rondinone, Feb. 12, 2002, 69 pgs.
U.S. Appl. No. 10/074,804, entitled "Secured Data Format for Access Control," inventor Garcia, Feb. 12, 2002, 108 pgs.
U.S. Appl. No. 10/075,194, entitled "System and Method for Providing Multi-location Access Management to Secured Items," inventor Vainstein et al., Feb. 12, 2002, 110 pgs.
U.S. Appl. No. 10/074,996, entitled "Method and Apparatus for Securing Electronic Data," inventor Lee et al., Feb. 12, 2002, 111 pgs.
U.S. Appl. No. 10/074,825, entitled "Method and Apparatus for Accessing Secured Electronic Data Off-line," inventor Lee et al., Feb. 12, 2002, 108 pgs.
U.S. Appl. No. 10/105,532, entitled "System and Method for Providing Different Levels of Key Security for Controlling Access to Secured Items," inventor Hildebrand et al., Mar. 20, 2002, 86 pgs.
U.S. Appl. No. 10/186,203, entitled "Method and System for Implementing Changes to Security Policies in a Distributed Security System," inventor Huang, Jun. 26, 2002, 65 pgs.
U.S. Appl. No. 10/201,756, entitled "Managing Secured Files in Designated Locations," inventor Alain, Jul. 22, 2002, 121 pgs.
U.S. Appl. No. 10/206,737, entitled "Method and System for Updating Keys in a Distributed Security System," inventor Hildebrand, Jul. 26, 2002, 60 pgs.
U.S. Appl. No. 10/246,079, entitled "Security System for Generating Keys from Access rules in a Decentralized Manner and Methods Therefor," inventor Hildebrand, Sep. 17, 2002, 78 pgs.
U.S. Appl. No. 10/259,075, entitled "Effectuating Access Policy Changes to Designated Places for Secured Files," inventor Crocker, Sep. 27, 2002, 60 pgs.
U.S. Appl. No. 10/286,575, entitled "Method and Architecture for Providing Access to Secured Data from Non-Secured Clients," inventor Vainstein, Nov. 1, 2002, 46 pgs.
U.S. Appl. No. 10/295,363, entitled "Security System Using Indirect Key Generation from Access Rules and Methods Therefor," inventor Vainstein, Nov. 15, 2002, 70 pgs.
U.S. Appl. No. 11/889,310, entitled "Methods and Systems for Providing Access Control to Electronic Data," inventor Rossmann, Aug. 10, 2007, 90 pgs.
U.S. Appl. No. 11/797,367, entitled "Method and System for Managing Security Tiers," inventor Vainstein, May 2, 2007, 11 pgs.
Adobe Acrobat 5.0 Classroom in a Book, Adobe Press, Jun. 26, 2001, pp. 1-4.
Adobe Acrobat Security Settings, Acrobat 7.0, Nov. 15, 2004, pp. 1-4.
"Security Options". Dec. 20, 2001. DC & Co. pp. 1-2.
Microsoft Press Computer Dictionary, 1997, Microsoft Press, Third Edition, p. 426.
Search Report, completion date May 8, 2003, for European Patent Application No. EP 02 25 8530, 2 pages.
Search Report, completion date Oct. 2, 2003, for European Patent Application No. EP 02 25 8531, 2 pages.
Search Report, completion date Apr. 14, 2005, for European Patent Application No. EP 02 25 8533, 2 pages.
Search Report, completion date Mar. 16, 2005, for European Patent Application No. EP 02 25 8534, 2 pages.
Search Report, completion date Mar. 2, 2005, for European Patent Application No. EP 02 25 8535, 2 pages.
Search Report, completion date Mar. 3, 2005, for European Patent Application No. EP 02 25 8537, 2 pages.

Search Report, completion date May 12, 2005, for European Patent Application No. EP 02 25 8539, 2 pages.

Search Report, completion date Jul. 6, 2005, for European Patent Application No. EP 02 25 8529, 4 pages.

Search Report, completion date Oct. 8, 2003, for European Patent Application No. EP 02 25 8536, 2 pages.

Search Report, completion date May 8, 2003, for European Patent Application No. EP 02 25 8540, 2 pages.

Examination Report, completion date Jun. 18, 2008, for European Patent Application No. EP 02 258 532.7-1244, 6 pgs.

Boneh et al., "Hierarchical Identity Based Encryption with Constant Size Ciphertext," Advances in Cryptology- EUROCRYPT 2005, vol. 3493, Jun. 20, 2005, pp. 440-456.

Boneh et al., "IBE Secure E-mail," Stanford University, Apr. 8, 2002, http://crypto.stanford.edu/ibe/.

* cited by examiner

METHOD AND SYSTEM FOR PROTECTING ENCRYPTED FILES TRANSMITTED OVER A NETWORK

CROSS-REFERENCE TO RELATED APPLICATIONS

This application is related to U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," which is hereby incorporated by reference for all purposes.

BACKGROUND OF THE INVENTION

1. Field of the Invention

The present invention relates to security systems for data and, more particularly, to security systems that protect data in an inter/intra enterprise environment.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is an open, public and international network of interconnected computers and electronic devices. Without proper security measures, an unauthorized person or machine may intercept any information traveling across the Internet, and may even get access to proprietary information stored in computers that interconnect to the Internet but are otherwise generally inaccessible by the public.

There are many efforts in progress aimed at protecting proprietary information traveling across the Internet and controlling access to computers carrying the proprietary information. Cryptography allows people to carry over the confidence found in the physical world to the electronic world, thus allowing people to do business electronically without worries of deceit and deception. Every day hundreds of thousands of people interact electronically, whether it is through e-mail, e-commerce (business conducted over the Internet), ATM machines or cellular phones. The perpetual increase of information transmitted electronically has lead to an increased reliance on cryptography.

One of the ongoing efforts in protecting the proprietary information traveling across the Internet is to use one or more cryptographic techniques to secure a private communication session between two communicating computers on the Internet. Cryptographic techniques provide a way to transmit information across an unsecure communication channel without disclosing the contents of the information to anyone eavesdropping on the communication channel. An encryption process is a cryptographic technique whereby one party can protect the contents of data in transit from access by an unauthorized third party, yet the intended party can read the data using a corresponding decryption process.

Conventionally, network browsers (e.g., Internet or Windows browsers) are utilized to access content remotely located on the World Wide Web. In other words, with a network browser, a user can request a resource that is remotely located on a remote server coupled to the Internet. Alternatively, a network browser can be used to transmit a file to a remote server coupled to the Internet. Hence, network browsers are effective at allowing communications between network browsers and remote servers. Although network browsers greatly facilitate access to data, when network browsers are used on computing systems that utilize file security systems, network browsers present a security problem. More specifically, a network browser presents a security risk because it can transmit any of the files it accesses to a remote server (remote site). Hence, the security provided on secured files can be lost if unsecured versions of secured files are made available to network browsers. However, when the network browser merely desires access to the files for display or other non-transmission purposes, then the network browser does not present a security risk. Accordingly, if the network browser does intend to transmit a file to an unsecured remote server, then the security for the file as provided by the file security system is compromised.

Thus, there is an need for improved techniques to enable file security systems to permit the use of network browsers yet preserve the security on secured files.

SUMMARY OF THE INVENTION

The invention relates to improved approaches for protecting secured files when being used by an application (e.g., network browser) that is capable of transmitting the files over a network to unknown external locations.

One aspect of the invention pertains to restricting access to secured files so that unsecured versions of the secured files are not able to be transmitted over a network (e.g., the Internet) to unauthorized destinations. In one embodiment, in opening a file for use by a network browser, the network browser receives a secured (e.g., encrypted) version of the secured file when the destination location (e.g., destination address) for the network browser is not trusted, but receives an unsecured (e.g., unencrypted) version of the secured file when the destination location for the network browser is trusted. Another aspect of the invention pertains to monitoring processes operating on a computer system to determine destination locations, if any, of said processes, and then using such destination locations to determine whether to permit the processes to open files in a secure or unsecured manner.

The invention can be implemented in numerous ways, including as a method, system, device, and computer readable medium. Several embodiments of the invention are discussed below.

As a method for limiting access to a file stored in and secured by a file security system, one embodiment of the invention includes at least the acts of: receiving a request for access to a secured file, the request being initiated by a requestor and being associated with a process associated with a computer system; determining whether the process is trusted by the file security system; determining whether the requestor is permitted to access an unsecured version of the secured file; and unsecuring the secured file to produce an unsecured file, thereby permitting access to the unsecured file only when the process is determined to be trusted and the requestor is determined to be permitted to access an unsecured version of the unsecured file.

As a method for limiting access to a file secured by a file security system, another embodiment of the invention includes at least the acts of: receiving a file open request to open a secured file, the request being initiated by a requestor and being associated with a process associated with a computer system; determining whether the process is trusted by the file security system; determining whether the requestor has sufficient access privileges to open an unsecured version of the secured file; permitting the secured file to be opened for limited use by the requestor when the process is determined not to be trusted; and permitting the unsecured version of the secured file to be opened for use by the requestor when the process is trusted and the requestor has sufficient access privileges.

As a method for identifying a destination address being accessed by a window for a process operating on a computer system, one embodiment of the invention includes at least the acts of: determining a foreground window for the process, and examining a resource within the foreground window to determine a destination address that is being or is to be accessed by the process.

As a computer readable medium including at least computer program code for limiting access to a file secured by a file security system, one embodiment of the invention includes at least: computer program code for receiving a request for access to a secured file, the request being initiated by a requester and being associated with a process associated with a computer system; computer program code for determining whether the process is trusted by the file security system; computer program code for determining whether the requestor is permitted to access an unsecured version of the secured file; and computer program code for unsecuring the secured file to produce an unsecured file, thereby permitting access to the unsecured file only when the process is determined to be trusted and the requestor is determined to be permitted to access an unsecured version of the unsecured file.

As a computer system providing file security, one embodiment of the invention includes at least an access control system that limits access to stored files based on at least access rules and trusted criteria, a process operating on the computer system, and a destination monitor that monitors an external destination of the process. The access control system permits access to the stored, secured files only when the access rules are satisfied and the process as well as the external destination satisfy the trusted criteria.

Other objects, features, and advantages of the present invention will become apparent upon examining the following detailed description of an embodiment thereof, taken in conjunction with the attached drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
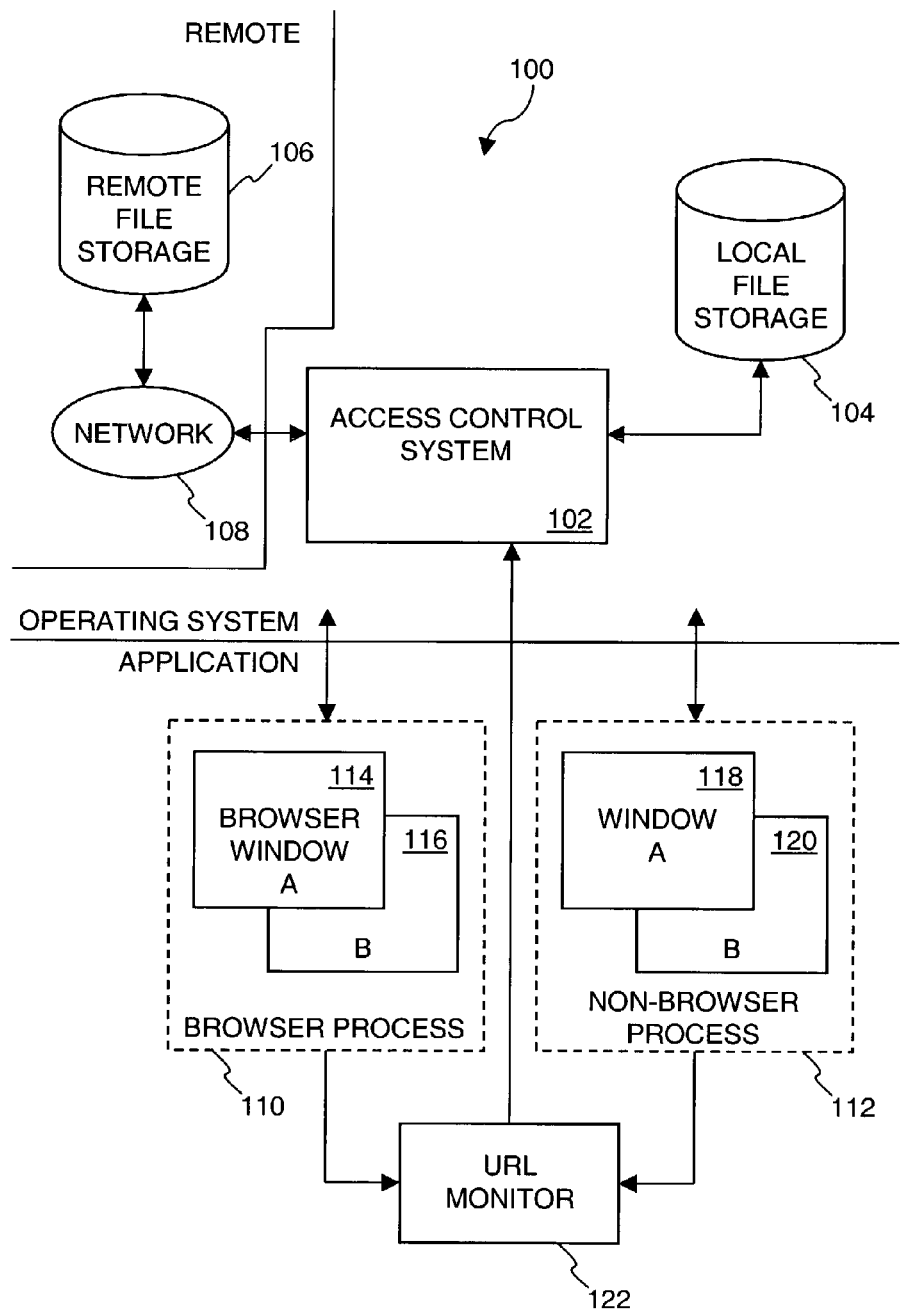
FIG. 1 is a block diagram of a file security system according to one embodiment of the invention.

The present invention relates to improved approaches for protecting secured files when being used by an application (e.g., network browser) that is capable of transmitting the files over a network to unknown external locations.

One aspect of the invention pertains to restricting access to secured files so that unsecured versions of the secured files are not able to be transmitted over a network (e.g., the Internet) to unauthorized destinations. In one embodiment, in opening a file for use by a network browser, the network browser receives a secured (e.g., encrypted) version of the secured file when the destination location (e.g., destination address) for the network browser is not trusted, but receives an unsecured (e.g., unencrypted) version of the secured file when the destination location for the network browser is trusted.

Another aspect of the invention pertains to monitoring processes operating on a computer system to determine destination locations, if any, of said processes, and then using such destination locations to determine whether to permit the processes to open files in a secure or unsecured manner.

Using the invention, a file security system can enforce the policy that a network browser never sends unsecured versions of secured files (e.g., decrypted files) to web-based email sites which are external destination locations that are unapproved (e.g., untrusted). On the other hand, the file security system is still able to send unsecured versions of the secured files to approved document management sites.

Secured files are files that require one or more keys, passwords, access privileges, etc. to gain access to their content. The security is often provided through encryption and access rules. The files, for example, can pertain to documents, multimedia files, data, executable code, images and text. In general, a secured file can only be accessed by authenticated users with appropriate access rights or privileges as compared to the access rules for the secured file. In one embodiment, each secured file is provided with a header portion and a data portion, where the header portion contains, or points to, security information. The security information is used to determine whether access to associated data portions of secured files is permitted.

As used herein, a user may mean a person, a software agent, a group of users, a member of the group, a device and/or application. Besides a person who needs to access a secured document, a software application or agent sometimes needs to access secured files in order to proceed. Accordingly, unless specifically stated, the "user" as used herein does not necessarily pertain to a human being.

In the following description, numerous specific details are set forth in order to provide a thorough understanding of the present invention. However, it will become obvious to those skilled in the art that the present invention may be practiced without these specific details. The description and representation herein may rely on the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-6. However, those skilled in the art will readily appreciate that the detailed description given herein with respect to these figures is for explanatory purposes as the invention extends beyond these limited embodiments.

FIG. 1 is a block diagram of a file security system 100 according to one embodiment of the invention. The file security system 100 includes an access control system 102 that controls access to files maintained by the file security system 100. The access control system 102 couples to a local file storage 104. The access control system 102 also couples to a remote file storage 106 over a network 108. The network 108 can be a local area network, a wide area network or the Internet, or some combination thereof. Typically, the files are maintained in an encrypted format and the access control system 102 operates to permit access to unencrypted versions of the files only to requestors that have been properly authenticated and have sufficient access privileges.

The file security system 100 can operate on a computing system. The computing system is typically a client machine, though it could also be coupled to and use resources of a server machine. An operating system of the computing device hosting at least a portion of the file security system 100 includes the access control system 102 and the local file storage 104 or an interface thereto in an operating system layer. The computing device also operates to execute one or more applications in an application layer. These applications execute one or more processes. As shown in FIG. 1, as a representative example, a browser process 110 and a non-browser process 112 are active within the application layer. The browser process 110 is produced by a network browser application, and the non-browser process 112 is produced by an application other than a network browser application. The browser process 110 produces a browser window A 114 and a browser window B 116. Typically, these browser windows 114 and 116 are displayed on a display device associated with the computing device. The browser window A 114 is deemed a foreground window as it is on top of and, in this case, overlaps a portion of the browser window 116. The non-browser process 112 produces a window A 118 and a window B 120. The window A 118 is deemed a foreground window as it is on top of and, in this example, overlaps a portion of the window B 120.

The browser process 110 and the non-browser process 112 can access secured files via the operating system. These secured files can be stored locally in the local file storage 104 or stored remotely in the remote file store 106. As such, the access control system 102 needs to limit access to the secured files such that a process operating in the application layer is not able to transmit unsecured versions of the secured files to unauthorized external locations.

The file security system 100 includes an address identifier monitor 122. In general, an address identifier identifies a destination address and may, for example, be a Universal Resource Identifier (URI) or Universal Resource Locator (URL). To facilitate the description of the invention, the address identifier monitor 122 is referred to herein as a URL monitor 122. The URL monitor 122 monitors each of the processes resident in the application layer, namely, in this example, the processes 110 and 112. The URL monitor 122 determines, for each process, a destination URL (i.e., an external destination) for the foreground window. For example, the URL monitor 122 would determine a destination URL for the browser window A 114 and would determine a destination URL for the window A 118. However, since the window A 118 is produced by the non-browser process 112, the URL monitoring performed by the URL monitor 122 would normally not identify a URL associated with the window A 118 because it is not associated with a network browser and thus would not be accessing a destination URL.

The access control system 102 can then determine whether or not to permit access to secured files by the processes operating on the application layer. For example, if the browser process 110 were to seek access to a secured file, the access control system 102 would determine not only whether the browser process 110 is permitted to gain access but also whether the URL associated with the browser window A 114 is a permissible destination. In one embodiment, the access control system 102 determines whether the browser process and its URL are both trusted. In one implementation, the access control system 102 can maintain a list or table of trusted processes and/or URLs. Then, the access control system 102 can compare the browser process 110 and the URL associated with the browser window A 114, as determined by the URL monitor 122, to determine whether the browser process 110 is trusted at this time for access to the secured files. Thus, access control to secured files being requested by a process can be dependent on the URL (i.e., destination URL) associated with the process.

Accordingly, a network browser is able to send files to many different external sites. The file security system 100 operates to enforce whether or not these external sites are given an encrypted version of the file or a decrypted version of the file. The file security system 100 has the ability to detect whether the requestor is sending the file requested to a network browser, and if so, limiting the extent to which decrypted versions of the files are made available to the network browser.

As previously noted, the URL monitor 122 monitors each of the processes resident in the application layer to determine a destination URL, if any, for each process. Such monitoring can be performed in an active or passive manner. In the case of active monitoring, the URL monitor can periodically locate windows provided by an operating system and search through such windows for certain heuristics or attributes that would specify a URL associated with the window. For example, in the case of a network browser window (e.g., Internet Explorer), an address bar would typically appear towards the top portion of the content being displayed in the window.

In the case of passive monitoring, in one embodiment, a browser helper object (BHO) can be registered with the browser application, such as Internet Explorer from Microsoft Corporation. The browser helper object would then notify the URL monitor 122 each time the browser application goes to a new URL.

According to one embodiment, the access control system 102 can associate a given network browser process identifier (ID) with the URL that is currently being browsed by the process by determining which window is currently in the foreground, and if it is a browser window, which URL is being displayed. Such determination of the URL being browsed can be done with Application Programming Interfaces (APIs) provided in an operating system (e.g., Microsoft Windows XP) or through an active monitoring and evaluation technique.

Figure 2:
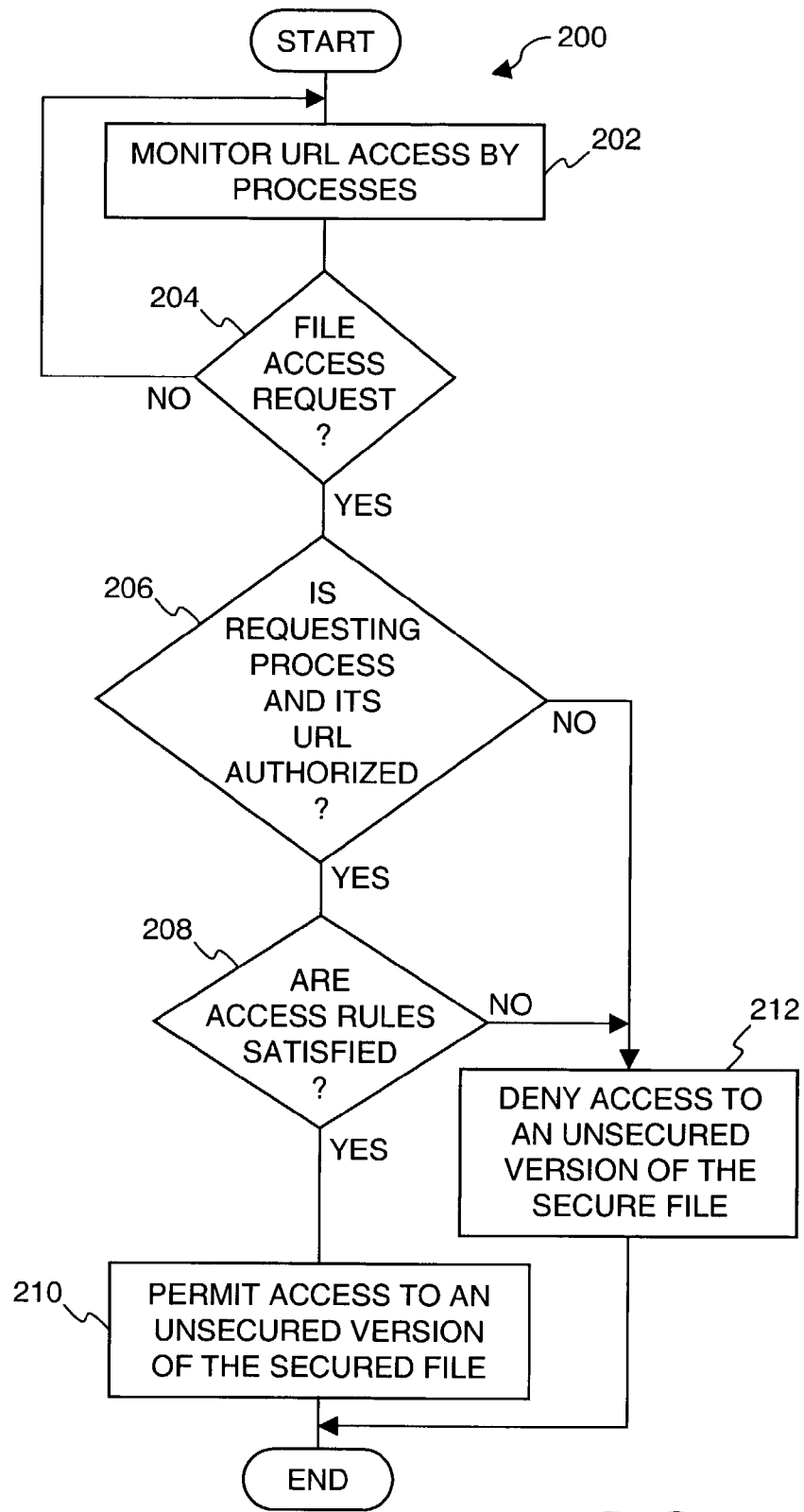
FIG. 2 is a flow diagram of file access processing according to one embodiment of the invention.

FIG. 2 is a flow diagram of file access processing 200 according to one embodiment of the invention. The file access processing 200 is, for example, performed by a file security system, such as the access control system 102 illustrated in FIG. 1.

The file access processing 200 monitors 202 URL access by processes. The URL specifies a network address for an external server. For example, if a process associated with a network browser is browsing a URL, the monitoring operates to identify the URL. Next, a decision 204 determines whether a file access request has been received. When the decision 204 determines that a file access request has not been received, the file access processing 200 awaits such a request and may continue to monitor URL access by the processes such that the monitoring remains current.

When the decision 204 determines that a file access request has been received, a decision 206 determines whether the requesting process and its URL (obtained via monitoring) are authorized to access the requested file. When the decision 206 determines that the requesting process and its URL are authorized, then a decision 208 determines whether the requested file can be accessed given the access privileges of the requestor. According to one embodiment, the secured file is in a form including embedded access rules that control restrictive access to the secured file. Accordingly, in such an embodiment, the access rules are evaluated against the access privileges of the user. When the decision 208 determines that access rules have been satisfied, then access to an unsecured version of the secured file is permitted 210.

On the other hand, when the decision 206 determines that the requesting process and its URL are not authorized, or when the decision 208 determines that the access rules are not satisfied, then access to an unsecured version of the secured file is denied 212. Following the operations 210 and 212, the file access processing 200 is complete and ends.

Figure 3:
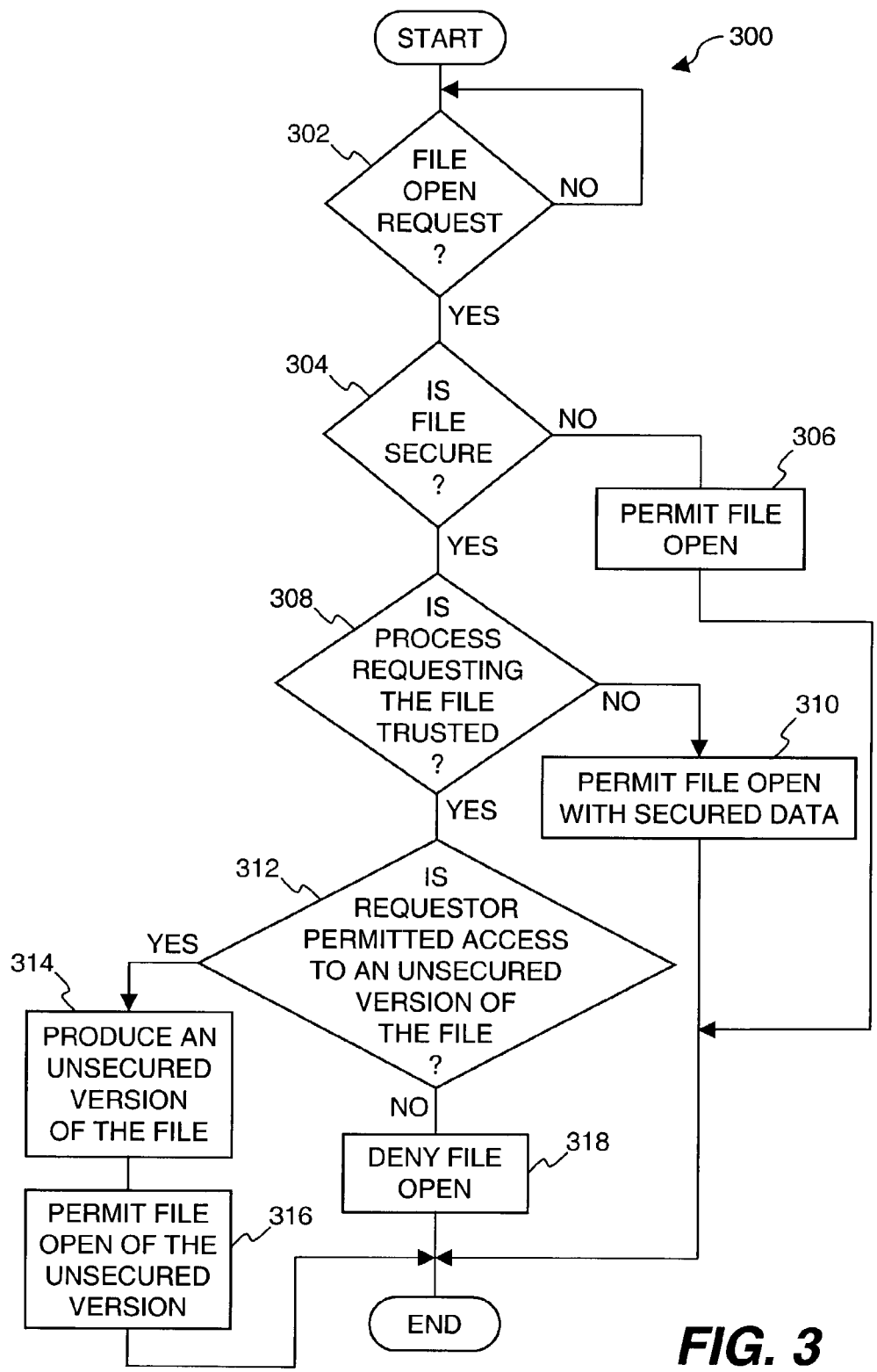
FIG. 3 is a flow diagram of file open processing according to one embodiment of the invention.

FIG. 3 is a flow diagram of file open processing 300 according to one embodiment of the invention. The file open processing 300 is, for example, performed by a file security system, such as the access control system 102 illustrated in FIG. 1.

The file open processing 300 begins with a decision 302 that determines whether a file open request has been received. The file open request is provided or initiated by a requester. The requestor can be a user. When the decision 302 determines that a file open request has not yet been received, the file open processing 300 awaits such a request.

Once the decision 302 determines that a file open request has been received, then a decision 304 determines whether the file is secured. Typically, the file is secured through access rules as well as encryption of some or all of the file. When the file to be accessed is not secured, then the file open is permitted 306 and the file open processing 300 is completed. In this case, the file open is permitted without restriction because the file to be opened is not secured.

On the other hand, when the decision 304 determines that the file to be accessed is secured, then a decision 308 determines whether the process requesting the file is trusted. A process can be deemed trusted if the process itself is deemed trusted and/or if an external destination (e.g., URL) of the process is trusted. When the decision 308 determines that the process requesting the file is not trusted, then the file open is permitted 310 but only with secured data. In other words, the file open is processed but the file is the secured file and thus the data remains secured (e.g., encrypted). After the file open has been permitted 310 with the secured data, the file open processing 300 is complete and ends.

Alternatively, when the decision 308 determines that the process requesting the file is trusted, then a decision 312 determines whether the requestor is permitted access to an unsecured version of the file. When the requester is permitted access to an unsecured version of the file, such as by satisfying access rules, an unsecured version of the file is produced 314. For example, when the file has been previously secured through encryption, the unsecured version of the file can be obtained by decryption of the file. Then, the file open is permitted 316 with the requestor receiving the unsecured version of the file. Following the operation 316, the file open processing 300 is complete and ends. On the other hand, when the decision 312 determines that the requester is not permitted to access an unsecured version of the file, the file open is denied 318 and the file open processing 300 is complete and ends.

In the above embodiment, a file open request is either denied, permitted with secured data, or permitted with unsecured data. However, to receive the unsecured data, the process requesting the file must be trusted and the requestor must satisfy the access rules. Consequently, processes that are not trusted are not able to open files to gain access to unsecured data in the files.

In general, trusted evaluation processing determines whether a process requesting a secured file is trusted. The trusted evaluation processing can maintain a list of process identifiers (IDs) with current URLs. When one of these processes attempts to open a secured file (e.g., an encrypted file), the trusted evaluation processing makes a decision whether or not the process and/or its current URL are trusted. Based on the trust determination, the secured file is made available to the process in its secured form if untrusted and in its unsecured form if trusted.

Figure 4:
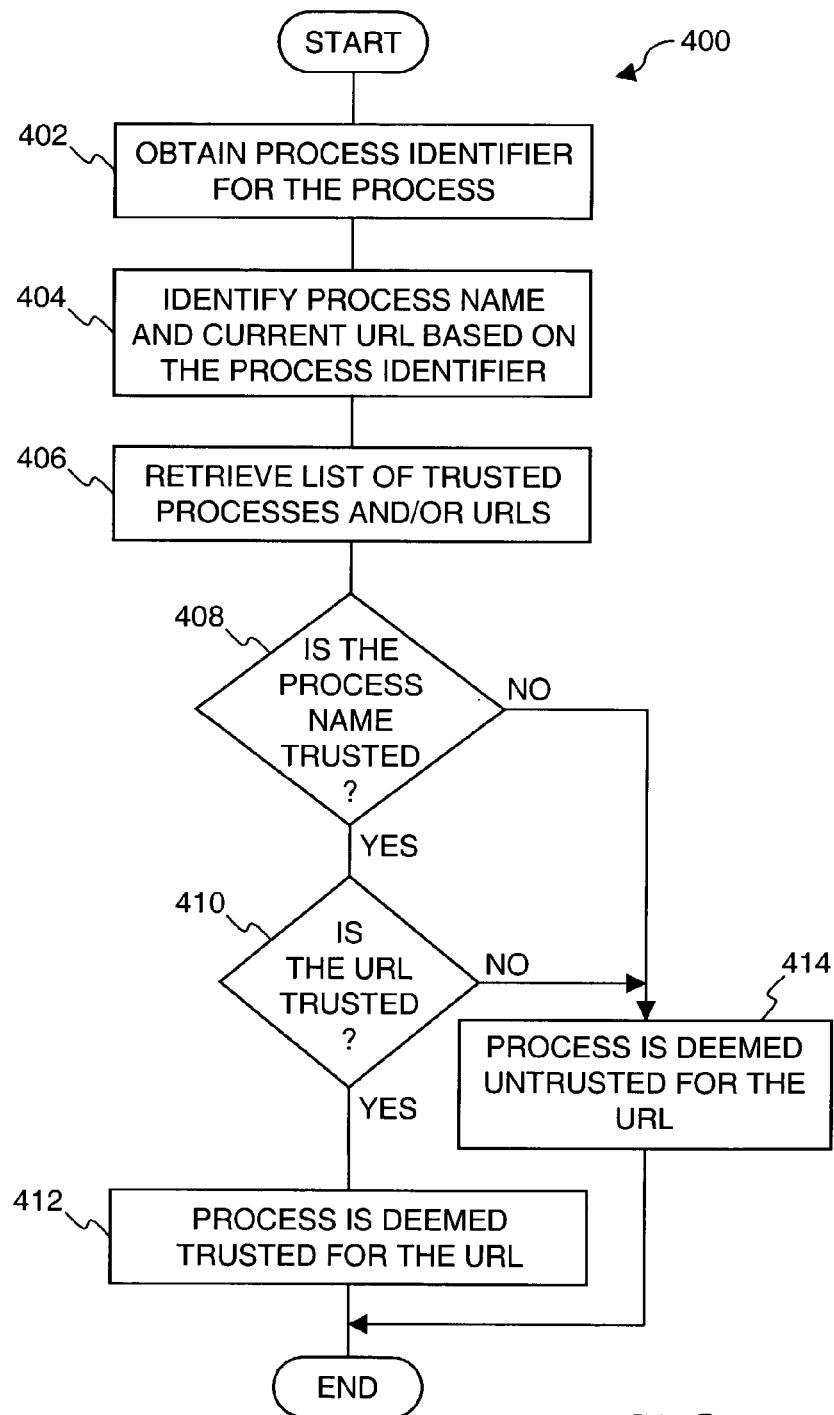
FIG. 4 is a flow diagram of trusted evaluation processing according to one embodiment of the invention.

FIG. 4 is a flow diagram of trusted evaluation processing 400 according to one embodiment of the invention. The trusted evaluation processing 400 is, for example, processing that can be utilized to determine whether the process requesting the file is trusted. For example, the trusted evaluation processing 400 can represent one embodiment of processing associated with the decision 308 illustrated in FIG. 3.

The trusted evaluation processing 400 initially obtains 402 a process identifier for the process that is requesting access to a secured file. Then, using the process identifier, a process name and a current URL can be identified 404 for the process. In one embodiment, the process identifier is used to retrieve the associated process names and the current URL associated with the process, where the current URL was previously obtained by monitoring the process. A list of trusted processes and/or URLs can also be retrieved 406. The list of trusted processes and/or URLs can be predetermined, or determined in advance, of the operation 406. In one embodiment, a system administrator could have previously identified those processes and/or URLs that are considered to be trusted. For example, a system administrator can configure a list of trusted processes and URLs that are to be deemed trusted.

A decision 408 then determines whether the process name is trusted. Here, the process name of the process requesting access to the secured file can be checked against the trusted processes within the list of trusted processes and/or URLs. When the decision 408 determines that the process name is trusted, then a decision 410 can determine whether the URL is trusted. In performing the decision 410, the current URL associated with the process can be compared to the URLs within the list of trusted processes and/or URLs. When the decision 410 determines that the URL is trusted, then the process is deemed 412 trusted for the URL. Alternatively, when the decision 408 determines that the process name is not trusted or when the decision 410 determines that the URL is not trusted, then the process is deemed 414 untrusted for the URL. Following the operations 412 and 414, the trusted evaluation processing 400 is complete and ends.

Note that, in this embodiment, a process is trusted if its process name can be trusted and if specific URLs can be trusted. Hence, with respect to a particular access request, a process may or may not be deemed trusted depending upon the URL associated with the process. In other words, in order to be trusted, both the process and the specific URLs must be trusted.

Further, the list of trusted processes and/or URLs can be organized or arranged in a variety of different ways such that those processes and/or URLs to be trusted are designated in a positive or negative sense. For example, the list of trusted processes and/or URLs can contain those processes that are trusted or those processes that are untrusted. Likewise, the list can include those specific URLs that are untrusted or those specific URLs that are trusted.

In one embodiment, the processes being determined to be trusted or untrusted are network browsers. Note that the trusted evaluation processing 400 assumes (for security sake) that a network browser (or other process) is opening a file with the intent to transmit it to the site at the given URL; however, opening a file by a network browser does not necessitate its transmission to a remote site.

Figure 5:
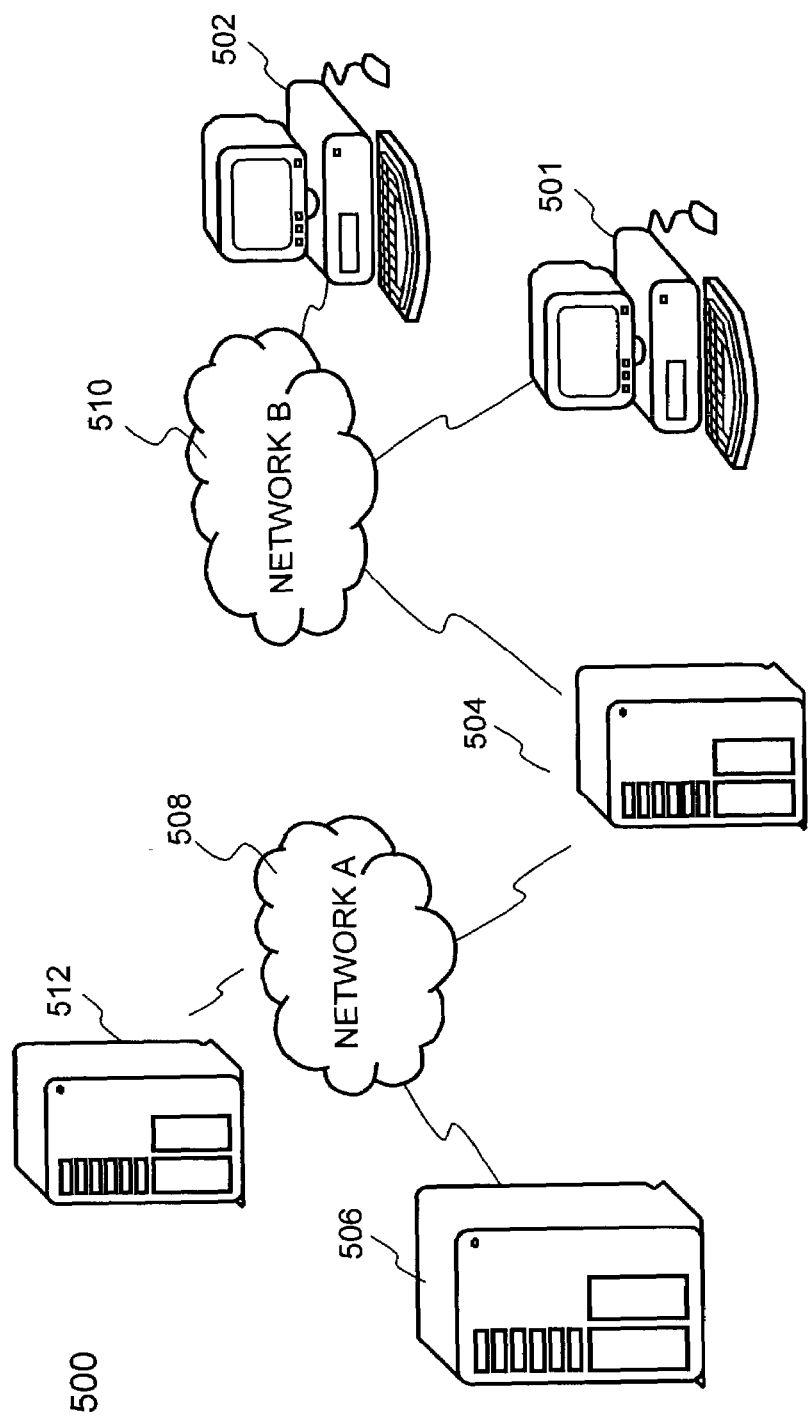
FIG. 5 shows a basic security system in which the invention may be practiced in accordance with one embodiment thereof.

FIG. 5 shows a basic security system 500 in which the invention may be practiced in accordance with one embodiment thereof. The security system 500 may be employed in an enterprise or inter-enterprise environment. It includes a first server 502 (also referred to as a central server) providing centralized access management for the enterprise thus files secured in the security system 500 can be controlled for restrictive access. To provide the dependability, reliability and scalability of the system, one or more second servers 504 (also referred to as local servers of which one is shown) may be employed to provide backup or distributed access management for users or client machines serviced locally. For illustration purposes, there are two client machines 501 and 502 being serviced by a local server 504. Alternatively, one of the client machines 501 and 502 may be considered as a networked storage device.

Secured files may be stored in either one of the devices 501, 502, 504 and 506. It is assumed that the client machine 501 corresponds to a file security system 100 of FIG. 1. When a user of the client machine 501 attempts to send a secured file to a remote destination 512, one or more of the processing 200, 300 and 400 discussed above are activated to ensure that the requested secured file is delivered without compromising the security imposed on the secured file.

Figure 6:
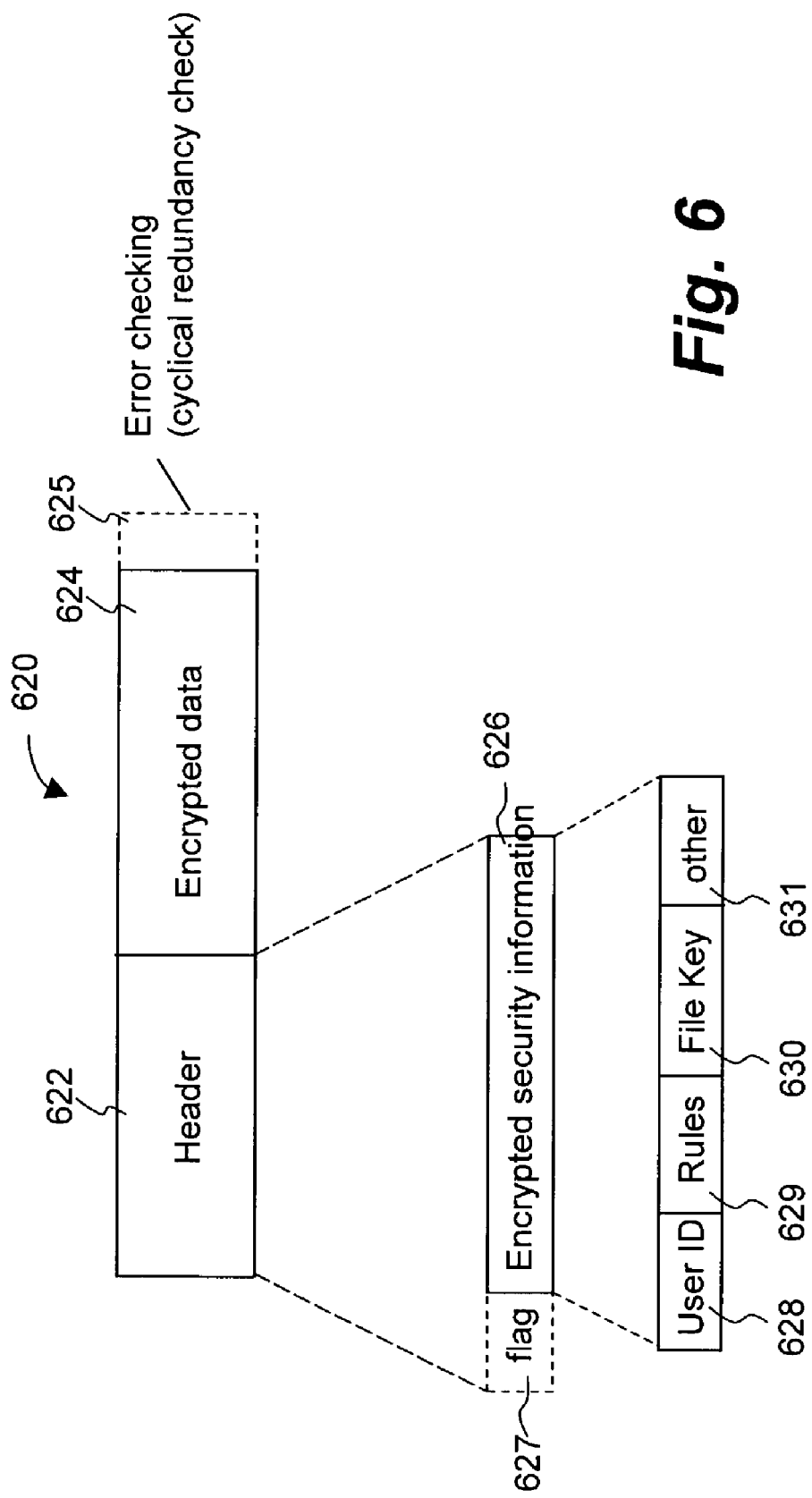
FIG. 6 shows an exemplary data structure of a secured file that may be used in one embodiment of the invention.

FIG. 6 shows an exemplary data structure 620 of a secured file that may be used in one embodiment of the invention. The data structure 620 includes two portions: a header (or header portion) 622 and encrypted data (or an encrypted data portion) 624. The header 622 can be generated in accordance with a security template associated with the store and thus provides restrictive access to the data portion 624 that is an encrypted version of a plain file. Optionally, the data structure 620 may also include an error-checking portion 625 that stores one or more error-checking codes, for example, a separate error-checking code for each block of encrypted data portion 624. These error-checking codes may also be associated with a Cyclical Redundancy Check (CRC) for the header 622 and/or the encrypted data portion 624. The header 622 includes a flag bit or signature 627 and security information 626 that is in accordance with the security template for the store. According to one embodiment, the security information 626 is encrypted and can be decrypted with a user key associated with an authenticated user (or requester).

The security information 626 can vary depending upon implementation. However, as shown in FIG. 6, the security information 626 includes a user identifier (ID) 628, access policy (access rules) 629, a file key 630 and other 631. Although multiple user identifiers may be used, a user identifier 628 is used to identify a user or a group that is permitted to access the secured file 620. The access rules 629 provide restrictive access to the encrypted data portion 624. The file key 630 is a cipher key that, once obtained, can be used to decrypt the encrypted data portion 624 and thus, in general, is protected. In one implementation of the structure 620, the file key 630 is encrypted in conjunction with the access rules 629. In another implementation of the structure 620, the file key 630 is double encrypted with a protection key and further protected by the access rules 629. The other 631 is an additional space for other information to be stored within the security information 626. For example, the other information 631 may be used to include other information facilitating secure access to the secured file, such as version number or author identifier.

The invention is preferably implemented by software or a combination of hardware and software, but can also be implemented in hardware. The invention can also be embodied as computer readable code on a computer readable medium. The computer readable medium is any data storage device that can store data which can thereafter be read by a computer system. Examples of the computer readable medium include tangible media such as read-only memory, random-access memory, CD-ROMs, DVDs, magnetic tape, and optical data storage devices. The computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The advantages of the invention are numerous. Different embodiments or implementations may yield one or more of the following advantages. One advantage of the invention is that file security systems are able to protect secured files (e.g., documents) even when network browsers seek access to secured files. Another advantage of the invention is that a file security system can enforce the policy that a network browser never sends unsecured versions of secured files (e.g., decrypted files) to unapproved sites. For example, the policy could prevent a network browser from sending unsecured versions of secured files to web-based email sites which are external destination locations that are unapproved (e.g., untrusted), yet the file security system would still be able to send unsecured versions of the secured files to approved sites that are permitted to access the secured files. The approved sites may, for example, be used by those temporary consultants or tele-commuters for an enterprise.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

What is claimed is:

1. A method comprising:
    (a) receiving a request for access to a secured file, wherein the request is initiated by a requestor, and wherein the request is associated with a process associated with a computer system;
    (b) determining whether the process is a trusted process, wherein the determination is based on trust of the process and trust of an external destination of the process, wherein the external destination of the process is based on one or more of a destination address associated with the process and a current Universal Resource Locator (URL) associated with the process;

(c) determining whether the requestor is permitted to access an unsecured version of the secured file; and (d) upon successful determination in steps (b) and (c), unsecuring the secured file to produce the unsecured version of the secured file, thereby permitting access to the unsecured version of the secured file.

2. The method as recited in claim 1, wherein the method further comprises:

(e) permitting access to the secured file when the determining (b) determines that the process is not trusted.

3. The method as recited in claim 2, wherein the method further comprises:

(f) denying access to the secured file when the determining (b) determines that the process is trusted and the determining (c) determines that the requestor is not permitted to access an unsecured version of the secured file.

4. The method as recited in claim 3, wherein the process pertains to a network browser operating on the computer system.

5. The method as recited in claim 1, wherein the method further comprises:

(e) denying access to the secured file when the determining (b) determines that the process is trusted and the determining (c) determines that the requester is not permitted to access an unsecured version of the secured file.

6. The method as recited in claim 1, wherein:

the process has a current destination address associated therewith; and the determining (b) of whether the process is trusted by the file security system is determined based on at least the current destination address.

7. The method as recited in claim 6, wherein the current destination address is determined by monitoring a current destination address for each of a plurality of processes operating on the computer system.

8. The method as recited in claim 7, wherein when a process being monitored for a current destination address has multiple windows, the current destination address for the process pertains to one of the windows in a foreground position.

9. The method as recited in claim 1, wherein the determining (b) of whether the process is trusted by the file security system comprises:

(b1) identifying a process name and a current destination address for the process; and (b2) comparing the process name and the current destination address with a predetermined list of trusted processes and destination addresses.

10. The method as recited in claim 9, wherein step (b) further comprises:

(b3) concluding that the process is trusted when the comparing (b2) determines that the process name and the current destination address are present within the list of trusted processes and destination addresses.

11. The method as recited in claim 1, wherein the process pertains to a network browser operating on the computer system.

12. A method comprising:

(a) receiving a file open request to open a secured file, the request being initiated by a requester and being associated with a process;

(b) determining whether the process is a trusted process wherein the determination is based on trust of the process and trust of an external destination of the process, wherein the external destination of the process is based on one or more of a destination location associated with the process and a current Universal Resource Locator (URL) associated with the process;

(c) determining whether the requester is permitted to open an unsecured version of the secured file;

(d) permitting the secured file to be opened for limited use by the requestor when the process is determined not to be trusted; and (e) upon successful determination in steps (b) and (c), permitting the unsecured version of the secured file to be opened for use by the requestor.

13. The method as recited in claim 12, wherein the method further comprises:

preventing the secured file or the unsecured version of the secured file from being opened for use by the requestor when the requestor lacks permission.

14. The method as recited in claim 12, wherein the secured file is secured through encryption.

15. The method as recited in claim 12, wherein:

the process has a current Universal Resource Locator (URL) associated therewith, and the determining of whether the process is trusted by the file security system is determined based on at least the current URL.

16. The method as recited in claim 15, wherein the process pertains to a network browser operating on the computer system.

17. The method as recited in claim 15, wherein the current URL is determined by monitoring a current URL for each of a plurality of processes operating on the computer system.

18. The method as recited in claim 17, wherein when a process being monitored for a current URL has multiple windows, the current URL for the process pertains to one of the windows in a foreground position.

19. The method as recited in claim 15, wherein the determining of whether the process is trusted by the file security system comprises:

identifying a process name and a current Universal Resource Locator (URL) for the process; and comparing the process name and the current URL with a predetermined list of trusted processes and URLs.

20. The method as recited in claim 12, wherein the determining of whether the process is trusted by the file security system comprises:

identifying a process name and a current Universal Resource Locator (URL) for the process, and comparing the process name and the current URL with a predetermined list of trusted processes and URLs.

21. The method as recited in claim 20, wherein the method further comprises:

concluding that the process is trusted when the comparing determines that the process name and the current URL are present within the list of trusted processes and URLs.

22. The method as recited in claim 12, wherein the process pertains to a network browser operating on the computer system.

23. A computer readable storage medium having computer program code recorded thereon, that when executed by a processor, causes a processor to limit access to a file secured by a file security system, the computer readable storage medium comprising:

computer program code enabling a processor to receive a request for access to a secured file, wherein the request is initiated by a requester, and wherein the request is associated with a process;

computer program code enabling the processor to determine whether the process is trusted wherein the determination is based on trust of the process and trust of an external destination of the process, wherein the external destination of the process is based on one or more of a destination address associated with the process and a current Universal Resource Locator (URL) associated with the process;

computer program code enabling the processor to determine whether the requestor is permitted to access an unsecured version of the secured file; and computer program code enabling the processor to unsecure the secured file to produce an unsecured version of the secured file, thereby permitting access to the unsecured version of the secured file.

24. The computer readable storage medium as recited in claim 23, wherein the process pertains to a network browser operating on the computer system.

25. The computer readable storage medium as recited in claim 23, wherein the computer program code enabling the processor to determine whether the process is trusted by the file security system comprises:

computer program code enabling the processor to identify a process name and a current destination address for the process;

computer program code enabling the processor to compare the process name and the current destination address with a predetermined list of trusted processes and destination addresses; and computer program code enabling the processor to conclude that the process is trusted when the computer program code enabling the processor to compare determines that the process name and the current destination address are present within the list of trusted processes and destination addresses.

26. The computer readable storage medium as recited in claim 23, wherein the process has a current destination address associated therewith, and wherein the computer program code enabling the processor to determine determines whether the process is trusted by the file security system based on at least the current destination address.

27. The computer readable storage medium as recited in claim 26, wherein the current destination address is determined by monitoring a current destination address for each of a plurality of processes operating on the computer system.

28. The computer readable storage medium as recited in claim 27, wherein when a process being monitored for a current destination address has multiple windows, the current destination address for the process pertains to one of the windows in a foreground position.

29. The computer readable storage medium as recited in claim 26, wherein the computer readable storage medium further comprises:

computer program code enabling the processor to permit access to the secured file when the computer program code enables the processor to determine determines that the process is not trusted; and computer program code enabling the processor to deny access to the secured file when the computer program code enables the processor to determine that the process is trusted and the computer program code enabling the processor to determine that the requester is not permitted to access an unsecured version of the secured file.

30. The computer readable storage medium as recited in claim 26, wherein the current destination address is one of a Universal Resource Identifier (URI) or a Universal Resource Locator (URL).

31. A computer system providing file security, comprising:

an access control system configured to limit access to stored files based on at least access rules and trusted criteria, wherein the trusted criteria includes trust of the process and trust of an external destination of the process, wherein the external destination of the process is based on one or more of a destination address associated with the process and a current Universal Resource Locator (URL) associated with the process;

a process configured to operate on the computer system; and a destination monitor configured to monitor an external destination of the process, wherein the access control module permits access to the stored, secured files only when the access rules are satisfied and the process, as well as the external destination, satisfy the trusted criteria.

32. The computer system as recited in claim 31, wherein the process pertains to a network browser operating on the computer system.

33. The computer system as recited in claim 32, wherein the destination monitor examines a resource being displayed in a foreground window of the network browser to determine the external destination that is being or is to be accessed by the network browser.

* * * * *